United States Patent [19]

Iijima et al.

[11] Patent Number: 5,736,115
[45] Date of Patent: Apr. 7, 1998

[54] PROCESS FOR THE REMOVAL OF CARBON DIOXIDE FROM GASES

[75] Inventors: Masaki Iijima, Tokyo; Shigeaki Mitsuoka, Hiroshima-ken, both of Japan

[73] Assignee: Mitsubishi Jukogyo Kabushiki Kaisha, Tokyo, Japan

[21] Appl. No.: 692,582

[22] Filed: Aug. 6, 1996

[30] Foreign Application Priority Data

Dec. 1, 1995 [JP] Japan .................................. 7-314121

[51] Int. Cl.$^6$ .................................................. C01B 31/20
[52] U.S. Cl. ............................................ 423/228; 423/229
[58] Field of Search ............................... 423/228, 229; 564/507

[56] References Cited

U.S. PATENT DOCUMENTS

| | | | |
|---|---|---|---|
| 3,856,835 | 12/1974 | Guillot .................. | 260/429.9 |
| 4,101,633 | 7/1978 | Sartori et al. ........... | 423/228 |
| 4,143,119 | 3/1979 | Asperger et al. ......... | 423/226 |
| 4,371,450 | 2/1983 | Nieh ........................ | 252/189 |
| 4,372,873 | 2/1983 | Nieh ........................ | 252/389 |
| 4,405,577 | 9/1983 | Sattori et al. ............. | 423/223 |
| 4,446,119 | 5/1984 | Dupart et al. ............ | 423/228 |
| 5,084,201 | 1/1992 | Creco ....................... | 252/182.12 |
| 5,277,885 | 1/1994 | Peytavy et al. ........... | 423/228 |

FOREIGN PATENT DOCUMENTS

| | | | |
|---|---|---|---|
| 05580192A2 | 9/1993 | European Pat. Off. ....... | B01D 53/14 |
| 2001338 | 1/1979 | United Kingdom ........... | C10K 1/14 |

*Primary Examiner*—Wayne Langel
*Attorney, Agent, or Firm*—Bell Seltzer Intellectual Property Law Group; Alston & Bird LLP

[57] ABSTRACT

This invention relates to a process for the removal of carbon dioxide from gases which comprises the carbon dioxide absorption step of bringing a gas having a carbon dioxide partial pressure in the range of 0.3 to 50 atmospheres (absolute pressure) into gas-liquid contact with an absorbing fluid comprising an aqueous solution containing an amine compound of the general formula [1]

$$R^1R^2NCH_2CH(OH)CH_2OH \quad [1]$$

where $R^1$ and $R^2$ independently represent lower alkyl groups of 1 to 3 carbon atoms, so as to produce a treated gas having a reduced carbon dioxide content and a carbon dioxide-rich absorbing fluid; and the regeneration step of liberating carbon dioxide from the carbon dioxide-rich absorbing fluid by (1) flashing at atmospheric pressure or in the vicinity of atmospheric pressure and/or (2) steam stripping, so that a carbon dioxide-lean absorbing fluid is regenerated and recycled for use in the carbon dioxide absorption step.

As compared with a conventional process using an aqueous solution of MDEA, the process of this invention has higher $CO_2$ absorption capacity and is more advantageous from the viewpoint of energy efficiency in the regeneration of the absorbing fluid.

3 Claims, 2 Drawing Sheets

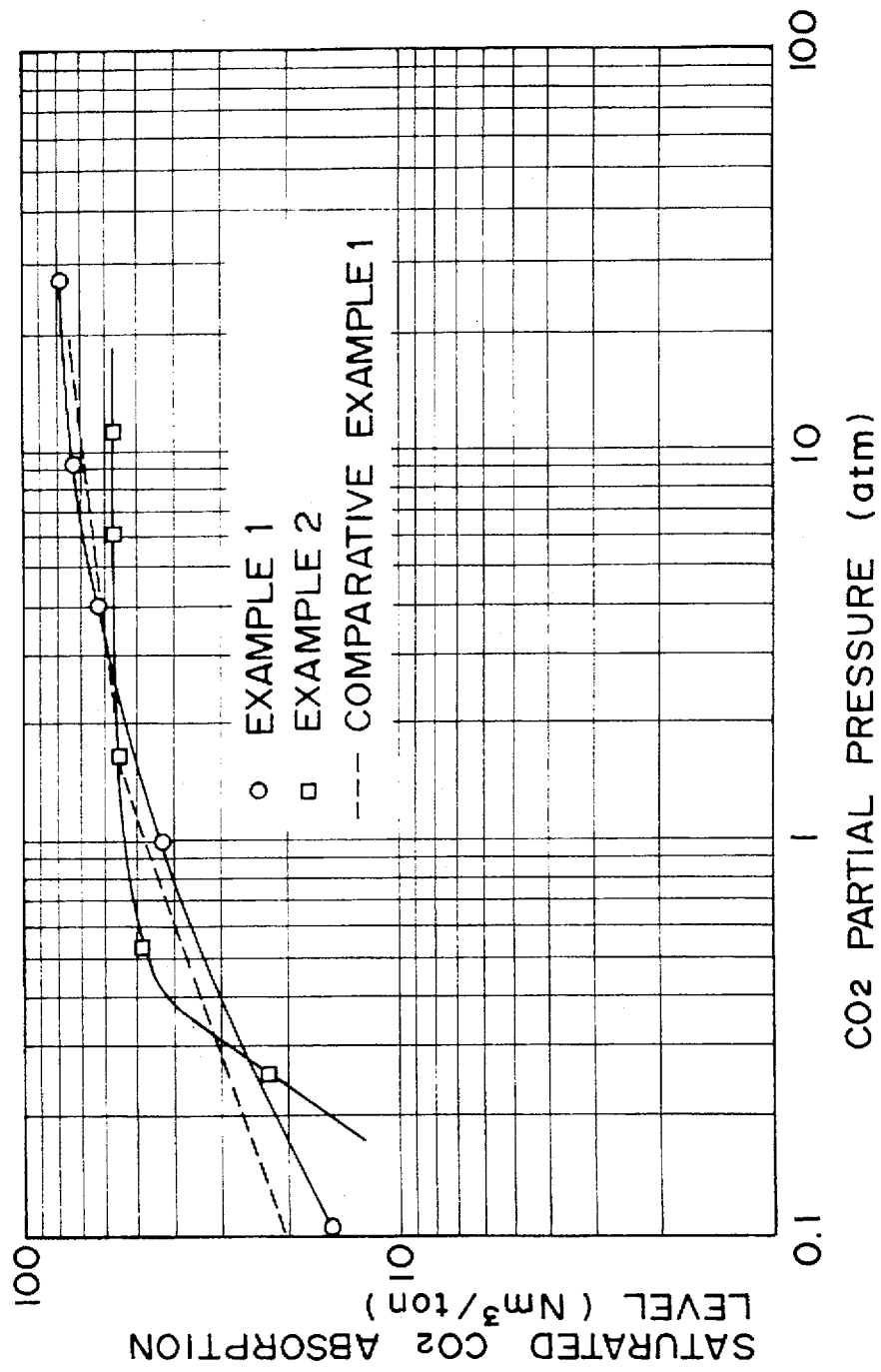

PROCESS FOR THE REMOVAL OF CARBON DIOXIDE FROM GASES

BACKGROUND OF THE INVENTION

1. Field of the Invention

This invention relates to a process for the removal of carbon dioxide ($CO_2$) from gases. More particularly, it relates to a process for the removal of $CO_2$ from a gas having a $CO_2$ partial pressure in the range of 0.3 to 50 atmospheres with high energy efficiency.

2. Description of the Related Art

In chemical industries and gas-related industries, the necessity for removing $CO_2$ from various gases having a $CO_2$ partial pressure in the range of about 0.3 to 50 atmospheres is often encountered. As an $CO_2$ absorbing fluid for meeting this necessity by gas-liquid contact, an aqueous solution of N-methyldiethanolamine (MDEA) with or without a reaction accelerator (e.g., piperazine) has been used in many cases.

SUMMARY OF THE INVENTION

It is an object of the present invention to provide a process for the removal of $CO_2$ from gases which uses an absorbing agent that has higher $CO_2$ absorption capacity and is more advantageous from the viewpoint of energy efficiency in the regeneration of the absorbing fluid, as compared with a conventionally used carbon dioxide absorbing agent comprising an aqueous solution of MDEA.

As a result of intensive investigations on the above described problem, the present inventors have found that the use of a specific amine compound is very effective. The present invention has been completed on the basis of this finding.

Accordingly, the present invention provides:

(1) a process for the removal of carbon dioxide from gases which comprises the carbon dioxide absorption step of bringing a gas having a carbon dioxide partial pressure in the range of 0.3 to 50 atmospheres (absolute pressure) into gas-liquid contact with an absorbing fluid comprising an aqueous solution containing an amine compound of the general formula [1]

$$R^1R^2NCH_2CH(OH)CH_2OH \quad [1]$$

where $R^1$ and $R^2$ independently represent lower alkyl groups of 1 to 3 carbon atoms, so as to produce a treated gas having a reduced carbon dioxide content and a carbon dioxide-rich absorbing fluid; and the regeneration step of liberating carbon dioxide from the carbon dioxide-rich absorbing fluid by (1) flashing at atmospheric pressure or in the vicinity of atmospheric pressure and/or (2) steam stripping, so that a carbon dioxide-lean absorbing fluid is regenerated and recycled for use in the carbon dioxide absorption step;

(2) a process for the removal of carbon dioxide from gases as described in (1) above wherein the amine compound of the above general formula [1] is 3-(dimethylamino)-1,2-propanediol and the carbon dioxide partial pressure of the gas is in the range of 1 to 50 atmospheres (absolute pressure); and (3) a process for the removal of carbon dioxide from gases as described in (1) above wherein the amine compound of the above general formula [1] is 3-(diethylamino)-1,2-propanediol, the carbon dioxide partial pressure of the gas is in the range of 0.3 to 5 atmospheres (absolute pressure), and the carbon dioxide-lean absorbing fluid is regenerated by steam stripping.

As compared with a conventional process using MDEA, the process of the present invention can achieve higher energy efficiency in the removal of $CO_2$ from gases having a $CO_2$ partial pressure in the range of 0.3 to 50 atmospheres and in the regeneration of the absorbing fluid, and is very significant from the viewpoint of energy saving.

BRIEF DESCRIPTION OF THE DRAWINGS

FIG. 2 is a graph showing the saturated $CO_2$ absorption curves for the absorbing fluids used in Examples 1 and 2 and Comparative Example 1, as a function of the $CO_2$ partial pressure.

DETAILED DESCRIPTION OF PREFERRED EMBODIMENTS

Figure 1:
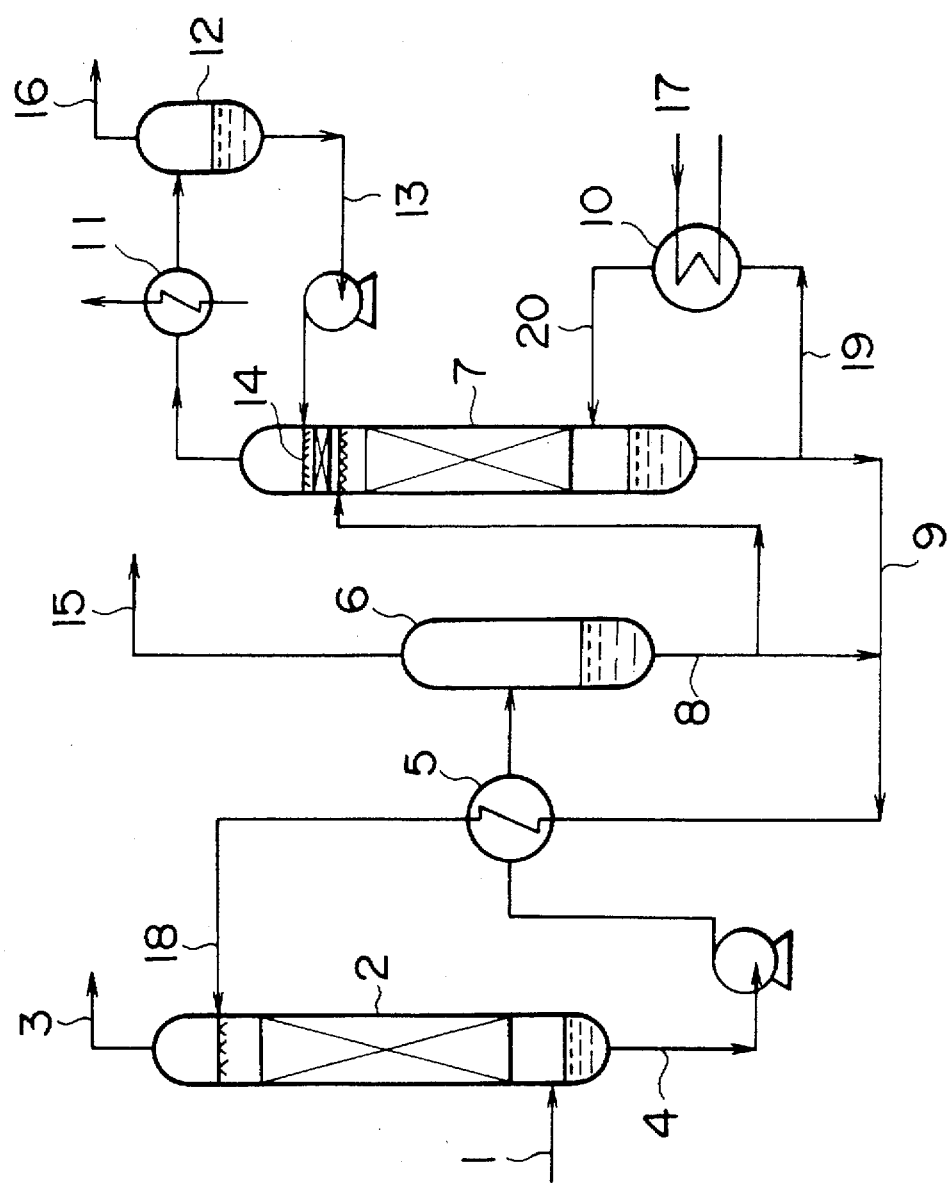
FIG. 1 is a flow diagram of a process for the removal of $CO_2$ from gases in accordance with the present invention.

In the amine compounds of the above general formula [1] which are used as absorbing agents in the present invention, lower alkyl groups represented independently by $R^1$ and $R^2$ are, for example, methyl, ethyl, propyl and isopropyl groups. More preferred $R^1$ and $R^2$ include methyl or ethyl groups. Especially preferred amine compounds include 3-(dimethylamino)-1,2-propanediol in which $R^1$ and $R^2$ are both methyl groups, and 3-(diethylamino)-1,2-propanediol in which $R^1$ and $R^2$ are both ethyl groups.

In an absorbing fluid comprising an aqueous solution of the absorbing agent of the present invention, the concentration of the absorbing agent is usually in the range of 15 to 65% by weight and preferably in the range of 30 to 50% by weight. The temperature at which the gas to be treated is brought into contact with the absorbing fluid in the process of the present invention is usually in the range of 30° to 70° C.

If necessary, the absorbing fluid used in the present invention may contain a corrosion inhibitor, a deterioration inhibitor and the like.

Moreover, in order to further enhance the absorption capabilities of the absorbing fluid (e.g., the $CO_2$ absorption level and the absorption rate), one or more other amine compounds may be added thereto as $CO_2$ reaction accelerators. Such other amine compounds include, for example, 2-methylaminoethanol, 2-ethylaminoethanol, 2-isopropylaminoethanol, 2-n-butylaminoethanol, piperazine, 2-methylpiperazine, 2,5-dimethylpiperazine, piperidine and 2-piperidineethanol. Such other amine compounds are used, the concentration thereof is usually in the range of 1.5 to 50% by weight and preferably in the range of 3 to 40% by weight, provided that they are soluble in water together with the amine compound of the general formula [1].

The object gas to be treated in the present invention is one having a $CO_2$ partial pressure in the range of 0.3 to 50 atmospheres (the term "partial pressure" as used herein means an absolute pressure), and specific examples thereof include various industrial gases produced or dealt with in chemical plants, such as natural gas and synthesis gases. In addition to $CO_2$, the object gas to be treated may contain other acid gases (e.g., $NO_2$, NO and $SO_2$) which are absorbed into the absorbing fluid used in the present invention. However, it is preferable that they are present in minor amounts as compared with $CO_2$, and it is more preferable that they are not present.

When 3-(dimethylamino)-1,2-propanediol is selected from among various amine compounds usable in the present invention and used as the absorbing agent, the $CO_2$ partial pressure of the object gas to be treated is preferably in the range of 1 to 50 atmospheres and more preferably in the range of 5 to 50 atmospheres. In this case, the absorbing fluid is regenerated by (1) flashing, (2) steam stripping in a regeneration tower equipped with a reboiler, or a combination of (1) and (2).

When 3-(diethylamino)-1,2-propanediol is used as the absorbing agent, the $CO_2$ partial pressure of the object gas to be treated is preferably in the range of 0.3 to 5 atmospheres and more preferably in the range of 0.3 to 2 atmospheres. In this case, the absorbing fluid is preferably regenerated solely by steam stripping in a regeneration tower equipped with a reboiler.

An exemplary system for carrying out the process of the present invention is specifically described below with reference to FIG. 1. In FIG. 1, only essential units are shown.

In FIG. 1, reference numeral 1 designates an object gas to be treated; 2, an absorption tower; 3, treated gas; 4, a $CO_2$-rich absorbing fluid; 5, a heat exchanger which is installed as required; 6, a flash drum; 7, a regeneration tower; 8, a first regenerated $CO_2$-lean absorbing fluid; 9, a second regenerated $CO_2$-lean absorbing fluid; 10, a reboiler; 11, an overhead condenser; 12, a separating drum; 13, a recirculation fluid; 14, a nozzle; 15 and 16, liberated $CO_2$; 17, a steam source; 18, a $CO_2$-lean absorbing fluid; and 19 and 20, lines. A gas having a $CO_2$ partial pressure in the range of 0.3 to 50 atmospheres (i.e., an object gas 1 to be treated) is fed to the lower part of an absorption tower 2. This absorption tower 2 is packed, for example, with an wetted-wall type packing material so that the ascending gas will come into efficient gas-liquid contact with a $CO_2$-lean absorbing fluid 18 fed to the upper part thereof. The treated gas 3 having been freed of $CO_2$ by contact with $CO_2$-lean absorbing fluid 18 is discharged from the top of absorption tower 2. On the other hand, $CO_2$-lean absorbing fluid 18 having absorbed $CO_2$ as a result of the gas-liquid contact turns into a $CO_2$-rich absorbing fluid 4, which is transferred to a regeneration step by means of a pump and regenerated therein. The regeneration step comprises a flash drum 6 and a regeneration tower 7. In operation, the use of flash drum 6 alone, the use of both flash drum 6 and regeneration tower 7, or the use of regeneration tower 7 alone is suitably chosen according to the type of the absorbing agent and the treating conditions.

When flash drum 6 alone is used, $CO_2$-rich absorbing fluid 4 having a pressure higher than atmospheric pressure is introduced into flash drum 6 which is preset at atmospheric pressure or in the vicinity thereof (i.e., atmospheric pressure ±0.5 atmosphere). Thus, $CO_2$-rich absorbing fluid 4 is flashed to liberate some $CO_2$. The liberated $CO_2$ is discharged from the top of flash drum 6. The absorbing fluid having a reduced $CO_2$ content as a result of the liberation of some $CO_2$ (i.e., a first regenerated $CO_2$-lean absorbing fluid 8) is directly recycled to absorption tower 2 and reused therein. Alternatively, depending on the type of the absorbing agent and the treating conditions, this first regenerated $CO_2$-lean absorbing fluid 8 may be introduced into a regeneration tower 7.

The lower part of regeneration tower 7 is equipped with a reboiler 10 using a steam source 17, so that $CO_2$ is liberated from first regenerated $CO_2$-lean absorbing fluid 8 by steam stripping. More specifically, the bottom fluid of regeneration tower 7 is introduced through a line 19 into reboiler 10 and heated therein, and the generated steam is returned to the bottom of regeneration tower 7 through a line 20 and used to effect steam stripping of the first regenerated $CO_2$-lean absorbing fluid falling through regeneration tower 7. The liberated $CO_2$, together with steam, is discharged from the top of regeneration tower 7, cooled with an overhead condenser 11, and then introduced into a separating drum 12 where it is separated into the liberated $CO_2$ 16 and a condensate. The liberated $CO_2$ 16 is discharged from the system, while the condensate is recirculated to a nozzle 14 of regeneration tower 7 as a recirculation fluid 13. The regenerated absorbing fluid is withdrawn from the bottom of regeneration tower 7 as a second $CO_2$-lean absorbing fluid, recycled for use in the absorption step. Depending on the type of the absorbing fluid, the $CO_2$-rich absorbing fluid may be directly regenerated in regeneration tower 7, instead of being passed through flash drum 6 (the line used for this purpose is omitted in FIG. 1).

In the case of an absorbing fluid using 3-(dimethylamino)-1,2-propanediol (DMAPD) selected from among various amine compounds usable in the present invention, it is preferably applied to gases having a $CO_2$ partial pressure in the range of 1 to 50 atmospheres as described above. In this case, the absorbing fluid may be regenerated by using flash drum 6 alone, regeneration tower 7 alone, or both of them.

On the other hand, in the case of an absorbing fluid using 3-(diethylamino)-1,2-propanediol (DEAPD), it is preferably applied to gases having a $CO_2$ partial pressure in the range of 0.3 to 5 atmospheres. In this case, the absorbing fluid is preferably regenerated by using regeneration tower 7 alone.

The present invention is further illustrated with reference to the following examples in which the $CO_2$ absorption capacities of some amine compounds of the general formula [1] that can be used as absorbing agents in the present invention were tested by use of a small-scale absorption testing apparatus.

EXAMPLES 1-2 AND COMPARATIVE EXAMPLE 1

A 150 ml glass reactor was placed in a temperature-controlled thermostatic water bath and charged with 100 ml of a $CO_2$ absorbing fluid comprising a 45 wt. % aqueous solution of DMAPD (Example 1). While the absorbing fluid was kept at a temperature of 40° C. with stirring, $CO_2$ gas was supplied from a gas cylinder to the top of the reactor so as not to produce gas bubbles, and the unabsorbed $CO_2$ was discharged from the reactor through a $CO_2$ discharge line provided with an automatic control valve so as to maintain a constant $CO_2$ pressure within the reactor. After the start of the $CO_2$ supply, samples of the absorbing fluid were taken at regular intervals and analyzed for the amount of $CO_2$ absorbed into the absorbing fluid by means of a $CO_2$ analyzer (a total organic carbon analyzer) to determine the saturated $CO_2$ absorption level. By repeating this procedure at varying $CO_2$ pressures within the reactor, a saturated $CO_2$ absorption curve for this absorbing fluid was constructed at a function of $CO_2$ partial pressure. By using DEAPD (Example 2) and MDEA (Comparative Example 1; a 45 wt. % aqueous solution) as absorbing agents, saturated $CO_2$ absorption curves were constructed in the same manner as described above. The results thus obtained are shown in FIG. 2. In FIG. 2, the abscissa indicates the partial pressure of $CO_2$ (i.e., the $CO_2$ pressure within the reactor in these tests) and the ordinate indicates the saturated $CO_2$ absorption level (expressed in terms of $Nm^3$ of $CO_2$ per ton of absorbing fluid).

As is evident from FIG. 2, DMAPD [represented by open circles (○)] used in Example 1 of the present invention shows a greater $CO_2$-absorbing tendency than MDEA (represented by a broken line) used in Comparative Example 1, in the $CO_2$ partial pressure range of 1 to 50 atmospheres and, in particular, about 5 to 30 atmospheres. In the regeneration range lower than a $CO_2$ partial pressure of 1 atmosphere, however, DMAPD shows a more marked reduction in saturated absorption level. This indicates that, when the $CO_2$ partial pressure is lowered by flashing or steam stripping in the regeneration of FIG. 1, DMAPD permits an easier regeneration of the absorbing fluid than MDEA.

In the case of DEAPD [represented by open squares (□)] used in Example 2, the saturated absorption level becomes substantially constant at $CO_2$ partial pressures higher than 2 atmospheres, and somewhat lower than that for MDEA used in Comparative Example 1. However, DEAPD shows a much lower saturated absorption level than MDEA in the range of 0.2 atmosphere or less and preferably 0.1 atmosphere or less, indicating that DEAPD permits regeneration more easily (i.e., with less heating energy) than MDEA. Accordingly, although an absorbing fluid containing DEAPD may be used for the purpose of absorption and regeneration in the same manner as an absorbing fluid containing DMAPD, it can be seen that, since the absorption range of DEAPD is lower than that of DMAPD, the former is advantageously used to treat an object gas having a relatively low $CO_2$ partial pressure and regenerated at a lower $CO_2$ partial pressure by steam stripping rather than flashing.

We claim:

1. A process for removing carbon dioxide from gas, said method comprising:

contacting a gas having a carbon dioxide partial pressure ranging from 1 to 50 atmospheres absolute pressure with an absorbing fluid comprising an aqueous solution containing 3-(dimethylamino)-1,2-propanediol to produce a treated gas having a reduced carbon dioxide content and a carbon dioxide-rich absorbing fluid; and flashing said carbon dioxide-rich fluid at near atmospheric pressure to release carbon dioxide from said fluid such that a carbon dioxide-lean absorbing fluid is formed which may be used in said contacting step.

2. A process for removing carbon dioxide from gas, said method comprising:

contacting a gas having a carbon dioxide partial pressure ranging from 1 to 50 atmospheres absolute pressure with an absorbing fluid comprising an aqueous solution containing 3-(dimethylamino)-1,2-propanediol to produce a treated gas having a reduced carbon dioxide content and a carbon dioxide-rich absorbing fluid; and flashing a portion of said carbon dioxide-rich fluid at or near atmospheric conditions and steam stripping the remainder of said carbon dioxide-rich fluid such that a carbon dioxide-lean absorbing fluid is formed which may be used in said contacting step.

3. A process for removing carbon dioxide from gas, said method comprising:

contacting a gas having a carbon dioxide partial pressure ranging from 0.3 to 50 atmospheres absolute pressure with an absorbing fluid comprising an aqueous solution containing 3-(diethylamino)-1,2-propanediol to produce a treated gas having a reduced carbon dioxide content and a carbon dioxide-rich absorbing fluid; and steam stripping said carbon dioxide-rich fluid to release carbon dioxide from said fluid such that a carbon dioxide-lean absorbing fluid is formed which may be used in said contacting step.

* * * * *

UNITED STATES PATENT AND TRADEMARK OFFICE
CERTIFICATE OF CORRECTION

PATENT NO.    :    5,736,115
DATED         :    April 7, 1998
INVENTOR(S) : Iijima et al.

It is certified that error appears in the above-identified patent and that said Letters Patent is hereby corrected as shown below:

TITLE PAGE
[56] References Cited:

"Creco" should be --Greco--.

"05580192A2" should be --0558019A2--.

Column 6, line 4, after "at" insert --or--.

Signed and Sealed this

Fourth Day of August, 1998

Attest:

BRUCE LEHMAN

Attesting Officer

Commissioner of Patents and Trademarks